(12) United States Patent
Dou

(10) Patent No.: US 6,449,105 B1
(45) Date of Patent: Sep. 10, 2002

(54) IMAGE PICKUP LENS SYSTEM

(75) Inventor: Satoshi Dou, Tsurugashima (JP)

(73) Assignee: Milestone Co., Ltd., Tokyo (JP)

( * ) Notice: Subject to any disclaimer, the term of this patent is extended or adjusted under 35 U.S.C. 154(b) by 0 days.

(21) Appl. No.: 09/667,295

(22) Filed: Sep. 22, 2000

(30) Foreign Application Priority Data

Dec. 22, 1999 (JP) .......................................... 11-365536

(51) Int. Cl.[7] ................................................. G02B 9/04
(52) U.S. Cl. ...................... 359/793; 359/717; 359/753
(58) Field of Search ................................ 359/749–753, 359/793, 717, 738–740

(56) References Cited

U.S. PATENT DOCUMENTS 5,619,380 A * 4/1997 Ogasawara et al. ......... 359/661
5,677,798 A * 10/1997 Hirano et al. ............... 359/717
6,181,477 B1 * 1/2001 Okajima ..................... 359/642

* cited by examiner

Primary Examiner—Jordan M. Schwartz
(74) Attorney, Agent, or Firm—Koda & Androlia

(57) ABSTRACT

An image pickup lens system includes a first lens, a stop, and a second lens arranged in a row from an object side to an image side. The first lens is a meniscus resin lens having negative power and oriented such that a convex surface thereof faces the object side. The second lens is a meniscus resin lens having positive power and oriented such that a convex surface thereof faces the image side. The image pickup lens system has at least two aspheric lens surfaces such that the first lens has at least one aspheric surface and such that the second lens has at least one aspheric surface, and is configured so as to satisfy conditions represented by: $3.2f \leq |r3| \leq 50f$; $0.9f \leq d \leq 1.5f$; and $0.1 < |f2|/|f1| < 0.9$; where f is focal length of the image pickup lens system; $f1$ is focal length of the first lens; $f2$ is focal length of the second lens; d is distance between the convex surface of the first lens and the convex surface of the second lens (overall length of the image pickup lens system); and $r3$ is radius of curvature of a concave surface of the second lens facing the object side.

1 Claim, 3 Drawing Sheets

FIG. 2A
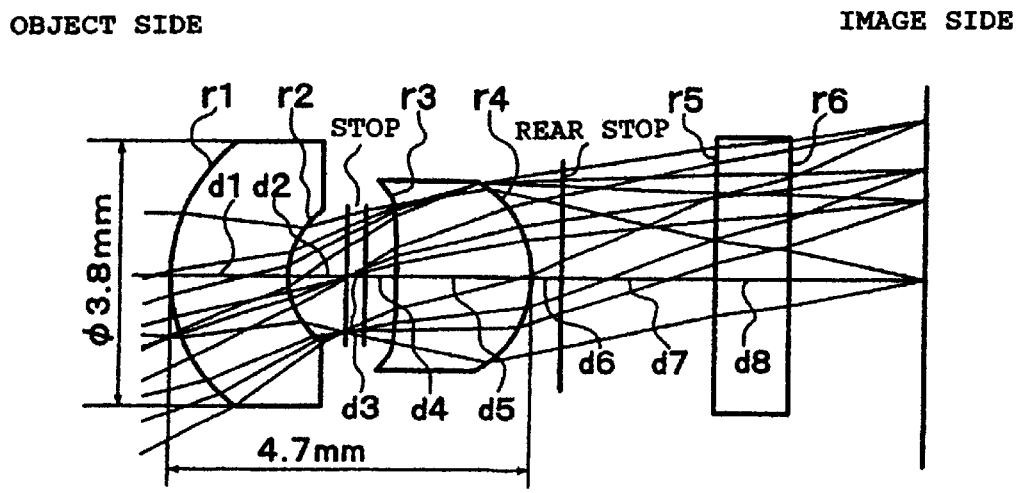
FIG. 2B(1)
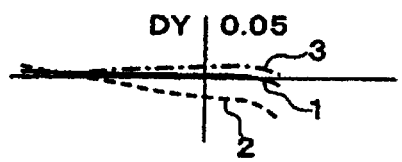
FIG. 2B(2)
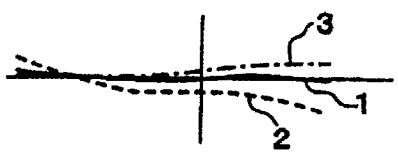
FIG. 2B(3)
FIG. 2B(4)
COMA ABERRATION
FIG. 2C
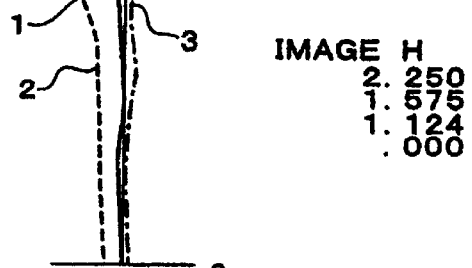
IMAGE H
2.250
1.575
1.124
.000
CHROMATIC AND
SPHERICAL ABERRATIONS
FIG. 2D   FIG. 2E
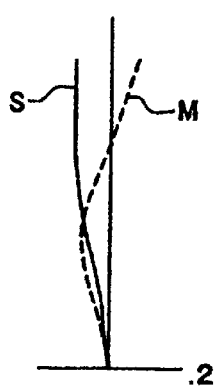
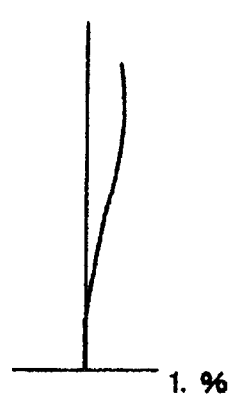
ASTIGMATIC         DISTORTION
ABERRATION         ABERRATION

COMA ABERRATION

CHROMATIC AND
SPHERICAL ABERRATIONS

ASTIGMATIC
ABERRATION

DISTORTION
ABERRATION

IMAGE PICKUP LENS SYSTEM

BACKGROUND OF THE INVENTION

1. Field of the Invention

The present invention relates to an image pickup lens system for use with a CCD or CMOS used in, for example, a monitor camera of a mobile apparatus, a monitor camera of a cellular phone, a monitor camera of a lap-top computer, or a TV camera.

2. Description of the Related Art

An image pickup lens system for use with such a CCD or CMOS has undergone reduction in the number of glass lenses or employment of a plastic lens in order to reduce cost and size.

However, some image pickup lens systems have attained a reduction in the number of glass lenses and size, but involve an increase in cost due to use of an aspheric mold glass lens. Other image pickup lens systems have reduced cost through employment of an aspheric plastic lens, but involve an increase in lens diameter or overall length, thereby failing to reduce size.

Because of a continuing tendency toward a reduction in the size of CCDs and CMOSs, demand exists to greatly decrease the distance between the first surface of a first lens and an image surface in an image pickup lens system.

The conventional image pickup lens systems fail to attain a satisfactory reduction in cost and size.

For employment in future compact apparatus using a CCD or CMOS such as mobile apparatus, lap-top computers, and cellular phones, an image pickup lens system must clear a hurdle of still greater reduction in the lens diameter and overall length, as compared with the conventional lens systems, so as to be compatible with a CCD or CMOS of greatly reduced size.

SUMMARY OF THE INVENTION

An object of the present invention is to provide an image pickup lens system for use with highly advanced CCDs or CMOSs used in, for example, cameras, monitors or TV cameras, providing brightness equivalent to an F-number of about 2, assuming a 2-lens configuration, and featuring low cost and being highly compact in lens diameter and overall length.

Another object of the present invention is to provide an image pickup lens system employing plastic lenses for weight reduction.

To achieve the above objects, the present invention provides an image pickup lens system configured in the following manner (see FIG. 1).

The image pickup lens system of the present invention comprises a first lens (L1), a stop, and a second lens (L2) arranged in a row from an object side to an image side. The first lens (L1) is a meniscus lens having negative power and oriented such that a convex surface thereof faces the object side. The second lens (L2) is a meniscus lens having positive power and oriented such that a convex surface thereof faces the image side.

The image pickup lens system has at least two aspheric lens surfaces such that the first lens (L1) has at least one aspheric surface and such that the second lens (L2) has at least one aspheric surface. Through employment of the aspheric lens surfaces and the above-mentioned configurational feature, various kinds of aberrations can be corrected appropriately, and plastic can be used effectively as lens material.

The image pickup lens system satisfies the following three configurational conditions.

$$3.2f \leq |r3| \leq 50f \qquad (1)$$

$$0.9f \leq d \leq 1.5f \qquad (2)$$

$$0.1 < |f2|/|f1| < 0.9 \qquad (3)$$

where f: focal length of the image pickup lens system;
f1: focal length of the first lens (L1);
f2: focal length of the second lens (L2);
d: distance between the convex surface (first surface) of the first lens (L1) and the convex surface (second surface) of the second lens (L2) (overall length of the image pickup lens system); and
r3: radius of curvature of the concave surface (first surface) of the second lens (L2) facing the object side.

The first lens (L1) and the second lens (L2) are of resin.

The second surface of the first lens (L1) may be aspheric, and the opposite surfaces of the second lens (L2) may be aspheric.

The number of lenses used in the present invention is as low as two, thereby reducing the size of the image pickup lens system for CCD or CMOS. In order to attain compactness and considerable brightness, two or more lens surfaces are aspheric.

Condition (1) specifies the distribution of power between the first surface (r3) and the second surface (r4) of the second lens (L2). When the absolute radius of curvature of the first surface (r3) of the second lens (L2) is less than the lower limit of condition (1), the radius of curvature of the second surface (r4) of the second lens (L2) decreases accordingly, causing an increase in spherical aberration and coma aberration. In this case, even when an aspheric profile is imparted to each of the first and second. surfaces (r3 and r4), the thus-increased aberrations is difficult to correct, resulting in failure to produce a quality image.

When the absolute radius of curvature of the first surface (r3) of the second lens (L2) is in excess of the upper limit of condition (1), the radius of curvature of the first surface (r3) of the second lens (L2) becomes excessively large. In this case, even when an aspheric profile is imparted to the first surface (r3), correction of the aberrations is difficult, resulting in failure to produce a quality image.

Condition (2) specifies the size of the image pickup lens system. When the overall length (d) of the image pickup lens system is less than the lower limit of condition (2), the spacing between the first lens (L1) and the second lens (L2) and the thickness of the second lens (L2) decrease, resulting in an increase in the focal length (f) of the image pickup lens system. Thus, the focal length (f) must be corrected through decrease in the radius of curvature of the second surface (r4) of the second lens (L2). That is, the image pickup lens system encounters difficulty in correcting spherical aberration and coma aberration, resulting in failure to produce a quality image.

When the overall length (d) is in excess of the upper limit of condition (2), a marginal-lumination ratio decreases. For correction of this decrease in marginal-lumination ratio, the diameter of the first lens (L1) must be increased. Thus, the image pickup lens system encounters difficulty in decreasing the overall length thereof and lens diameter.

Condition (3) specifies the distribution of power between the first lens (L1) and the second lens (L2). When the |f2|/|f1| value is less than the lower limit of condition (3), power of the second lens (L2) increases, resulting in a decrease in the radius of curvature of the second surface (r4) of the second lens (L2). Thus, the image pickup lens system encounters difficulty in correcting spherical aberration and coma aberration.

When the |f2|/|f1| value is in excess of the upper limit of condition (3), power of the second lens (L2) weakens, resulting in an increase in the focal length (f) and the back focal length (bf) of the image pickup lens system, resulting in an increase in the length of the overall optical path. Thus, the size of the image pickup lens system cannot be decreased.

When power of the first lens (L1) increases, and the |f2|/|f1| value is in excess of the upper limit of condition (3), the image pickup lens system encounters difficulty in correcting optical aberrations caused by the first lens (L1), resulting in failure to produce a quality image.

Through satisfaction of conditions (1) to (3), the image pickup lens system of the present invention attains compactness and excellent characteristics.

As described above, although the image pickup lens system of the present invention assumes a 2-group 2-lens configuration; i.e., includes a reduced number of lenses, the image pickup lens system of the present invention enables use of a plastic lens and attains high compactness, high performance, low cost, light weight, and good compatibility with CCDs and CMOSs.

BRIEF DESCRIPTION OF THE DRAWINGS

FIGS. 2A to 2E are diagrams showing optical paths and aberrations of an image pickup lens system according to a first embodiment of the present invention; and FIGS. 3A to 3E are diagrams showing optical paths and aberrations of an image pickup lens system according to a second embodiment of the present invention.

DESCRIPTION OF THE PREFERRED EMBODIMENTS

Figure 1:
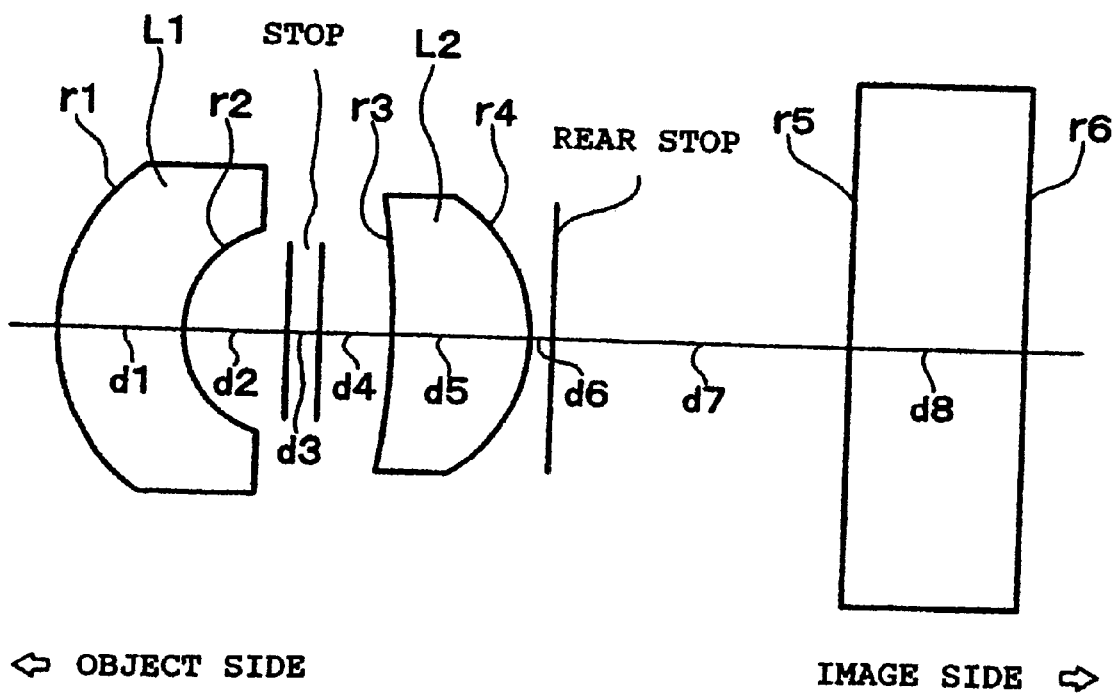
FIG. 1 is a configuration diagram of an image pickup lens system according to the present invention.

Embodiments of the present invention will next be described in detail with reference to the drawings. FIG. 1 shows the configuration of an image pickup lens system according to the present invention.

Tables 1 and 2 show configuration data regarding first and second embodiments of the present invention.

TABLE 1

Configuration Data (First Embodiment)

| Radius of curvature (ri) | Spacing (di) | Refractive index (ni) | Abbe number (vi) |
|---|---|---|---|
| r1 = 3.13 | d1 = 1.50 | n1 = 1.583 | v1 = 30 |
| r2 = 1.41 | d2 = 0.80 | | |
| Stop 0.00 | d3 = 0.20 | | |
| Stop 0.00 | d4 = 0.40 | | |
| r3 = −76.84 | d5 = 1.80 | n5 = 1.491 | v5 = 57.8 |
| r4 = −1.45 | d6 = 0.40 | | |
| Rear stop 0.00 | d7 = 2.00 | | |
| r5 = 0.00 | d8 = 0.95 | n8 = 1.52 | Cover glass |
| r6 = 0.00 | | | |

TABLE 1-continued

Paraxial Data

| Composite focal length | 3.893 mm |
|---|---|
| Fno (Numerical aperture) | 2.2 |

Coefficient of Aspheric Surface

| | | | | | | | | |
|---|---|---|---|---|---|---|---|---|
| r1 | K = 0.115 e + 1 | A = 0.8595 e − 2 | B = −0.7889 e − 3 | C = 0.3349 e − 3 | D = −0.2114 e − 4 |
| r2 | K = 0.7534 | A = 0.2955 e − 1 | B = 0.8024 e − 1 | C = −0.1174 e − 1 | D = 0.9262 e − 1 |
| r3 | K = 0.2873 e + 4 | A = −0.3217 e − 1 | B = 0.2247 e − 2 | C = 0.8691 e − 2 | D = −0.1068 e − 1 |
| r4 | K = −0.3463 | A = 0.2609 e − 2 | B = 0.6617 e − 2 | C = −0.2343 e − 2 | D = 0.2555 e − 3 |

TABLE 2

Configuration Data (Second Embodiment)

| Radius of curvature (ri) | Spacing (di) | Refractive index (ni) | Abbe number (vi) |
|---|---|---|---|
| r1 = 2.60 | d1 = 0.80 | n1 = 1.491 | v1 = 57.8 |
| r2 = 1.09 | d2 = 0.72 | | |
| Stop 0.00 | d3 = 0.20 | | |
| Stop 0.00 | d4 = 0.44 | | |
| r3 = −34.7 | d5 = 0.99 | n5 = 1.491 | v5 = 57.8 |
| r4 = −1.14 | d6 = 0.16 | | |
| Rear stop 0.00 | d7 = 2.00 | | |
| r5 = 0.00 | d8 = 1.20 | n8 = 1.52 | Cover glass |
| r6 = 0.00 | | | |

Paraxial Data

| Composite focal length | 2.879 mm |
|---|---|
| Fno (Numerical aperture) | 2.30 |

Coefficient of Aspheric Surface

| | | | | | |
|---|---|---|---|---|---|
| r1 | K = 0.1914 e + 1 | A = 0.5612 e − 1 | B = −0.4885 e − 2 | C = −0.8339 e − 3 | D = 0.4140 e − 2 |
| r2 | K = 0.1053 e + 1 | A = 0.1480 | B = 0.3708 e − 1 | C = −0.1625 | D = 0.4518 |
| r3 | K = 0.1082 e + 4 | A = −0.1334 e − 1 | B = −0.110 e − 1 | C = −0.3116 e − 1 | D = 0.4231 e − 1 |
| r4 | K = −0.5559 | A = −0.734 e − 2 | B = 0.164 e − 1 | C = −0.2368 e − 1 | D = 0.5129 e − 2 |

In the first and second embodiments, surface numbers i are counted from the object side to the image side and denote corresponding surfaces of components, such as lenses.

Symbols appearing in FIGS. 1, 2A, and 3A and Tables 1 and 2 are defined as follows:

ri: radius of curvature of surface i (as measured on axis for aspheric surface)

di: distance between surface i and surface i+1 ni: refractive index of medium present between surface i and surface i+1 vi: dispersion of medium present between surface i and surface i+1

Data on aspheric surfaces are shown at the bottom of Tables 1 and 2, together with surface numbers.

For a stop and a rear stop, a radius of curvature of 0 means that the radius of curvature is infinity.

Refractive index is measured by use of d rays (587.56 nm), and Abbe number represents dispersion.

In FIGS. 2B and 2C and 3B and 3C, numerals 1, 2, and 3 correspond to wavelengths of 587.56 nm, 480.0 nm, and 650.0 nm, respectively.

In FIGS. 2D and 2E, an end of each of curves representing astigmatic aberration and distortion aberration is located 2.25 mm from the center.

Figure 3A:
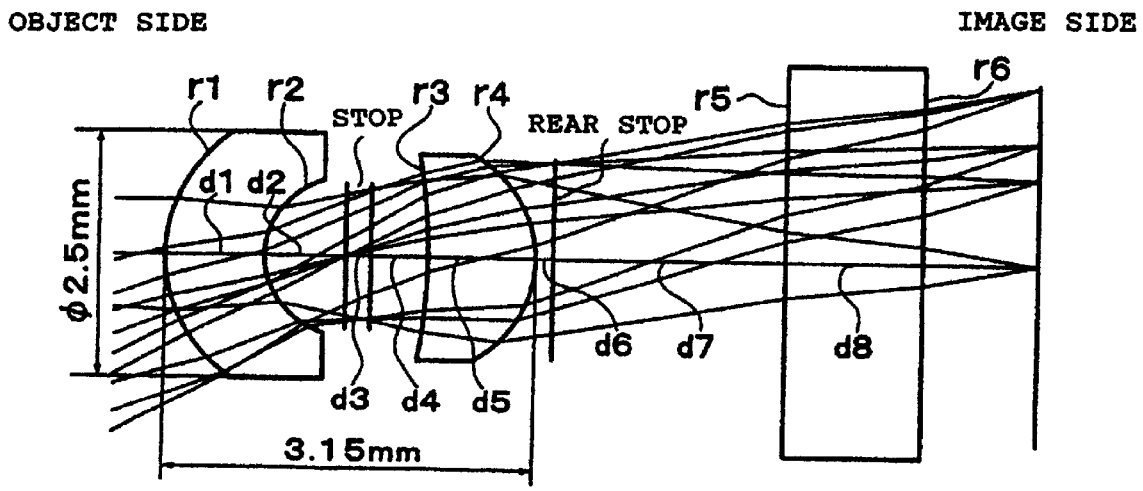
Figure 3A:
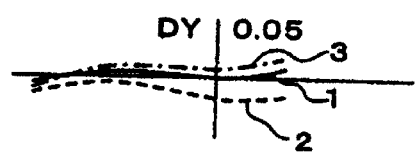
Figure 3A:
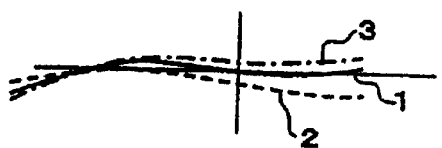
Figure 3A:
Figure 3A:
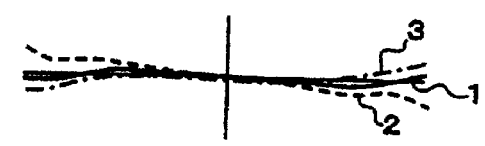
Figure 3C:
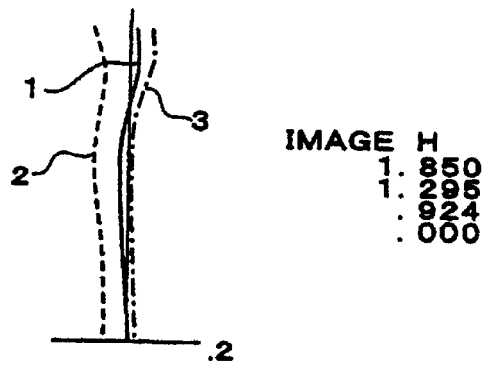
Figure 3D:
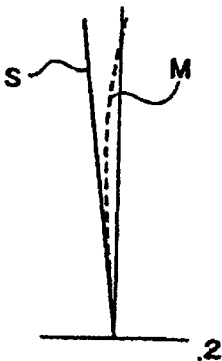
Figure 3E:
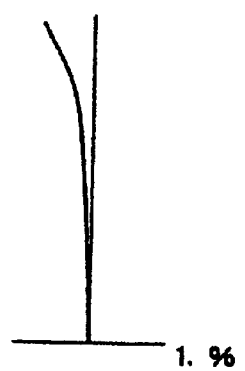

In FIGS. 3D and 3E, an end of each of curves representing astigmatism and distortion aberration is located 1.85 mm from the center.

An aspheric surface used in the present invention is represented by the following expression.

$$Z = ch^2/[1+\{1-(1+K)c^2h^2\}^{+\frac{1}{2}}] + Ah^4 + Bh^6 + Ch^8 + Dh^{10} \quad \text{Expression 1}$$

where

Z: depth from tangent plane with respect to vertex of surface;

C: paraxial radius of curvature of surface;

h: height above optical axis;

K: cone constant;

A: fourth-degree aspheric surface coefficient;

B: sixth-degree aspheric surface coefficient;

C: eighth-degree aspheric surface coefficient; and

D: tenth-degree aspheric surface coefficient.

In Tables 1 and 2, an appendix; for example, "e−1," to a value indicative of an aspheric surface coefficient denotes 10 to the power of −1.

Features of the first and second embodiments are described below.

A lens system of the first embodiment configured as represented by configuration data shown in Table 1 and as shown in FIG. 2A has the following features: the first lens (L1) is made of polycarbonate (PC) resin, and the second lens (L2) is made of polymethyl methacrylate (PMMA) resin;

opposite surfaces of the first lens (L1) and those of the second lens (L2) are aspheric;

focal length f1 of the first lens (L1) is −6.48 mm;

focal length f2 of the second lens (L2) is 2.99 mm;

radius of curvature r3 of the first surface of the second lens (L2) is −76.84 mm;

focal length f of the lens system is 3.893 mm; and distance d between the first surface of the first lens (L1) and the second surface of the second lens (L2) (overall length of the lens system) is 4.7 mm.

These characteristic values of the first embodiment satisfy conditions (1) to (3) as follows:

$$3.2f \leq |r3| \leq 50f \rightarrow 12.4576 \leq 76.84 \leq 194.65$$

$$0.9f \leq d \leq 1.5f \rightarrow 3.5037 \leq 4.7 \leq 5.8395$$

$$0.1 < |f2|/|f1| < 0.9 \rightarrow 0.1 < 0.461 < 0.9$$

The lens system of the first embodiment exhibits aberrations as shown in FIGS. 2B to 2E, thus producing a quality image.

A lens system of the second embodiment configured as represented by configuration,data shown in Table 2 and as shown in FIG. 3A has the following features: the first and second lenses (L1 and L2) are made of polymethyl methacrylate (PMMA) resin;

opposite surfaces of the first lens (L1) and those of the second lens (L2) are aspheric;

focal length f1 of the first lens (L1) is −4.63 mm;

focal length f2 of the second lens (L2) is 2.38 mm;

radius of curvature r3 of the first surface of the second lens (L2) is −34.7 mm;

focal length f of the lens system is 2.879 mm; and distance d between the first surface of the first lens (L1) and the second surface of the second lens (L2) (overall length of the lens system) is 3.15 mm.

These characteristic values of the second embodiment satisfy conditions (1) to (3) as follows:

$$3.2f \leq |r3| \leq 50f \rightarrow 9.2128 \leq 34.7 \leq 143.95$$

$$0.9f \leq d \leq 1.5f \rightarrow 2.5911 \leq 3.15 \leq 4.3185$$

$$0.1 < |f2|/|f1| < 0.9 \rightarrow 0.1 < 0.514 < 0.9$$

The lens system of the second embodiment exhibits aberrations as shown in FIGS. 3B to 3E, thus producing a quality image.

What is claimed is:

1. An image pickup lens system comprising a first lens, a stop, and a second lens arranged in a row from an object side to an image side, wherein said first lens is a meniscus resin lens having negative power and oriented such that a convex surface of said first lens faces the object side;

said second lens is a meniscus resin lens having positive power and oriented such that a convex surface of said second lens faces the image side; and said image pickup lens system has at least two aspheric lens surfaces such that said first lens has at least one aspheric surface and such that said second lens has at least one aspheric surface, and is configured so as to satisfy conditions represented by:

$$3.2f \leq |r3| \leq 50f;$$

$$0.9f \leq d \leq 1.5f;$$

and $$0.1 < |f2|/|f1| < 0.9;$$

where f: focal length of said image pickup lens system;

f1: focal length of said first lens;

f2: focal length of said second lens;

d: distance between the convex surface of said first lens and the convex surface of said second lens (overall length of said image pickup lens system); and r3: radius of curvature of a concave surface of said second lens facing the object side.

* * * * *